United States Patent
Schäty

[19]

[11] Patent Number: 5,947,669
[45] Date of Patent: Sep. 7, 1999

[54] MOUNTING SYSTEM WITH A FASTENING STUD AND A MOUNTING PART APPLIED THERETO

[75] Inventor: Harald Schäty, Wetzlar-Dutenhofen, Germany

[73] Assignee: Emhart Inc., Newark, Del.

[21] Appl. No.: 09/062,356

[22] Filed: Apr. 17, 1998

[30] Foreign Application Priority Data

| Apr. 17, 1997 | [DE] | Germany | 297 06 962 |
| Apr. 28, 1997 | [DE] | Germany | 297 07 663 |
| Sep. 11, 1997 | [DE] | Germany | 297 16 236 |

[51] Int. Cl.$^6$ .............................. F16B 21/00; F16B 37/08
[52] U.S. Cl. .......................... 411/324; 411/339; 411/433; 411/514
[58] Field of Search .................... 411/324, 418, 411/419, 420, 433, 437, 512, 513, 514, 338, 339

[56] References Cited

U.S. PATENT DOCUMENTS

| 1,187,714 | 6/1916 | Corey ..................................... 411/419 |
| 3,288,190 | 11/1966 | Holmes ............... 411/324 X |
| 4,518,297 | 5/1985 | Kraus ...................................... 411/437 |
| 4,571,136 | 2/1986 | Peek ........................................ 411/437 |
| 4,770,582 | 9/1988 | Junemann et al. ................. 411/437 X |
| 4,780,037 | 10/1988 | Payne ..................................... 411/433 |
| 4,850,778 | 7/1989 | Clough et al. ........................ 411/433 |
| 4,922,587 | 5/1990 | Pettit .................................. 411/514 X |
| 5,598,994 | 2/1997 | Olewinski et al. ................ 411/433 X |

*Primary Examiner*—Neill Wilson
*Attorney, Agent, or Firm*—Edward D. Murphy

[57] ABSTRACT

The invention relates to a mounting system with a fastening stud and a mounting part which can be applied to the fastening stud and has a receiving space for receiving the fastening stud, wherein the internal surface of the receiving space and the external peripheral surface of the fastening stud are frictionally connected to one another when the mounting part is applied and wherein the external peripheral surface has a structure with at least one substantially peripherally extending crest-like relief of dimensionally stable material and the internal surface has a structure with at least one relief of plastically deformable material extending substantially transversely to the peripheral direction. The radial elasticity of the fastening stud which is provided in any case by a slot is preferably increased by an additional axial aperture.

38 Claims, 3 Drawing Sheets

MOUNTING SYSTEM WITH A FASTENING STUD AND A MOUNTING PART APPLIED THERETO

BACKGROUND OF THE INVENTION

The invention relates to a mounting system with a fastening stud and a mounting part which can be applied thereto. The mounting part can be, in particular, a push-button for fastening trims on panels or a holder for fastening lines on components of a car.

Mounting systems with a fastening stud and a mounting part which can be applied thereto are known. The material of the mounting part is plastically deformed as it is applied thereto. The fastening studs usually have a textured surface the reliefs of which can be pressed, after application, into the material of the fastening part, particularly if the material is a plastics material.

Mounting systems in which the fastening stud is a weld stud with an external thread are known from DE-GM 296 20 020 and DE-GM 296 11 741. The weld stud is generally solid.

A mounting system is known from DE-GM 295 16 868 in which a mounting part is applied to a peg which is formed on a structure and has external profiling. A sheet of material can be introduced into lateral recesses in the mounting part or between the head of the mounting part and the structure so that the sheet of material is fixed on the structure. A mounting system of this type is used, in particular in the motor vehicle industry, for fastening carpets, foot mats, insulating mats and the like of relatively complicated geometries to a structure such as a vehicle body. The mounting parts of such mounting systems are also known as fastening clips.

A hollow tubular fastening stud which is radially elastically compressible and expandable is known from WO 94/03735. The elasticity can be utilised to fasten various mounting parts on the fastening stud. The hollow fastening stud can be welded by one axial end onto a structure. In a specific design, the fastening stud has an external thread. WO 94/03735 also discloses mounting parts which can be applied to the fastening stud, in particular mounting parts the mounting connection of which can be secured by an interlocking element which can be inserted into the interior of the tubular fastening stud to prevent radial compression of the fastening stud. In a specific design, the fastening stud has lateral recesses or holes in which projections on suitably shaped mounting parts can catch or engage to secure a mounted connection. The mounting part is applied by utilising the elasticity of the fastening stud in a radial direction.

A line holder which can be applied to a profiled stud or peg and comprises a plurality of arc-shaped holders for holding lines is known from DE 38 02 698 C2. After the insertion of lines, the connection is closed by placing a hoop over the holder orifices.

SUMMARY OF THE INVENTION

It is an object of the present invention to provide a mounting system with a fastening stud and a mounting part in which the mounting part can easily be applied to the fastening stud but is difficult to remove.

The term fastening stud in the sense of this specification refers not only to solid studs but to any fastening members with stud-like outer contours, in particular also the above-described tubular radially elastic fastening studs which can be fastened on a structure or are formed on a structure in the manner of a peg.

It is a further object of the invention to provide a mounting part for such a mounting system.

The present invention provides a mounting system with a fastening stud and a mounting part which can be applied to the fastening stud and has a receiving space for receiving the fastening stud, wherein the internal surface of the receiving space and the external peripheral surface of the fastening stud are frictionally connected to one another when the mounting part is applied, characterised in that the external peripheral surface has a structure with at least one substantially peripherally extending crest-like relief of dimensionally stable material and the internal surface has a structure with at least one relief of plastically deformable material extending substantially transversely to the peripheral direction.

The present invention further provides a mounting part with a receiving space for receiving a fastening stud, wherein the internal surface of the receiving space has a structure with at least one relief of plastically deformable material extending substantially transversely to the peripheral direction.

The present invention further provides a fastening stud, in particular for a mounting system or mounting part, which is internally hollow and is made radially elastically resilient by an axially extending slot, characterised in that at least one additional axial aperture is provided to increase the radial elasticity.

Since the crest-like relief and the relief made of plastically deformable material extend transversely to one another, at least one spot contact region is produced when the mounting part is applied, so that small forces acting substantially perpendicularly to the surfaces are sufficient to press the crest-like relief into the plastically deformable material. The deformable material can flow for a long time after application of the mounting part under the high pressure. A locally limited positive connection is produced by pressing in the crest-like relief, making the mounting part difficult to remove.

In one design of the mounting system, the receiving space is designed in the form of a duct with two mutually opposed orifices. This design allows mounting of the mounting part on the fastening stud from both sides. This is particularly advantageous if components having different dimensions are to be fastened on a structure using the mounting system. In particular with a design of the mounting part having a head and a shank which extends from the head and in whose interior the receiving space is located and in which design a component can be connected to the head, the fastening position of the component relative to the structure can be selected. The head of the mounting part can, for example, rest selectively on the structure or be spaced from the structure. The mounting part can also be applied to the fastening stud to different extents. The advantage of the mounting system according to the invention is noticed here in that the at least one crest-like relief can sink into the plastically deformable material at different positions. Therefore, it is no longer necessary to provide differently designed mounting parts for components of different thicknesses which are to be arranged between a head of the mounting and the structure.

In a development of the mounting system, the fastening stud is radially elastic. This property is preferably achieved in that the fastening stud is tubular in design with a substantially longitudinally extending slot. The elasticity of such a fastening stud can be increased according to the invention by at least one axial aperture which extends over a proportion of the axial length of the fastening stud. The receiving space of the mounting part is preferably designed such that the fastening stud is radially compressed on application. Its elasticity gives rise to outwardly directed restoring sources which, optionally together with other forces, cause the crest-like relief to be pressed into the plastically deformable material.

In an advantageous development, the fastening stud has an orifice at the end face. The mounting system also has a clamping member which can be introduced without play or with slight play into the orifice. The clamping member is preferably connected to the mounting part. In one design, the clamping member is introduced into the end-face orifice during application of the mounting part so that the tubular fastening stud is spread apart and the forces acting outwardly substantially perpendicularly to the peripheral surfaces are considerably increased or such forces are generated. In a further design, the clamping member is moved, after application of the mounting part onto the fastening stud, from a first position outside the fastening stud into a second position inside the fastening stud, the clamping member preferably being severed from the mounting part. It is desirable if the clamping member is connected, prior to application, via a thin material connection to the mounting part which tears during introduction of the clamping member into the orifices. This allows simple, reliable mounting of such a mounting part where the mounting part is mounted by two deliberate thrusts. The mounting part is applied to the fastening stud by the first thrust without the clamping member being driven through the orifice into the interior of the fastening stud. The clamping member is then driven in with the second thrust.

In a particularly preferred design, the fastening stud is produced from metal. It can preferably be fastened to a metal carrier component by electric arc stud welding. Reference is made, for example, to WO 94/037735 for further details.

A design in which the fastening stud has an external thread is also particularly preferred. The thread groove or the thread grooves are bordered by at least one crest-like relief. The mounting part can be removed from the fastening stud after application by unscrewing owing to the external thread. This affords advantages, in particular in car building, as graded separation of materials is demanded nowadays when a vehicle is scrapped.

BRIEF DESCRIPTION OF THE DRAWINGS

Embodiments of a mounting system and of a mounting part will now be described with reference to the accompanying drawings, in which.

DESCRIPTION OF THE PREFERRED EMBODIMENT

Figure 1:
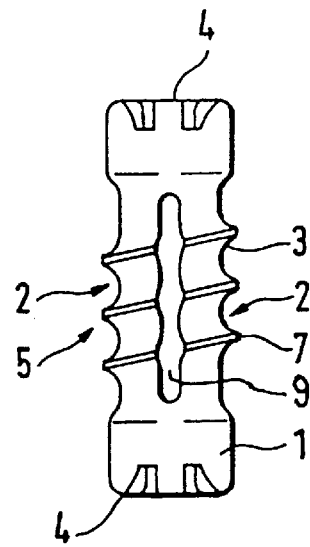
FIG. 1 is a schematic side view of a tubular fastening stud with external thread.
Figure 2:
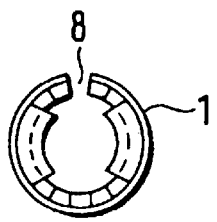
FIG. 2 is a view from above of the tubular fastening stud according to FIG. 1.

FIGS. 1 and 2 show a tubular weld stud 1 which can be used, in particular, as a fastening stud for a mounting system according to the invention, but is also suitable for other applications. The weld stud 1 can be selectively welded to a structure at one tube end. It has an external thread 5 with a substantially peripherally extending groove 2 and a crest 7. The groove 2 is bordered by flanks 3. The tubular weld stud 1 is radially elastic owing to a continuous slot 8 extending from top to bottom. The radial elasticity of the weld stud is further increased by an additional axial aperture 9, the axial aperture 9 preferably extending over at least half the axial length of the weld stud 1, having a smaller dimension in the peripheral direction than in the axial direction and being arranged substantially on the side of the weld stud 1 opposed to the slot 8. Two or more such axial apertures can also be provided, which should then be distributed together with the slot 8 substantially uniformly round the periphery. Axial apertures 8 are particularly advantageous if the material or the wall thickness of the weld stud would not otherwise allow satisfactory radial elasticity. The weld stud 1 has a respective tube orifice 4 at the top and bottom end.

Figure 3:
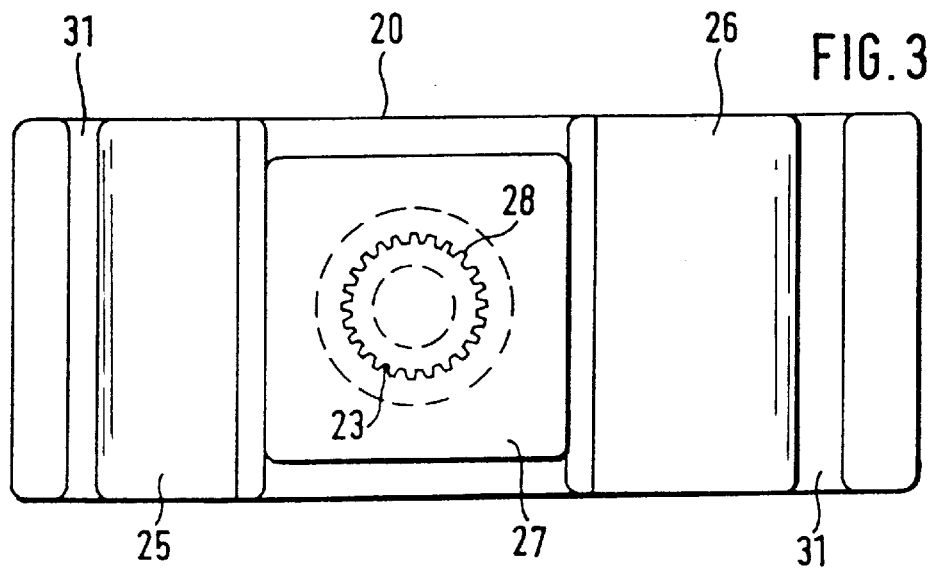
FIG. 3 is a view from above of a first embodiment of a mounting part.
Figure 4:
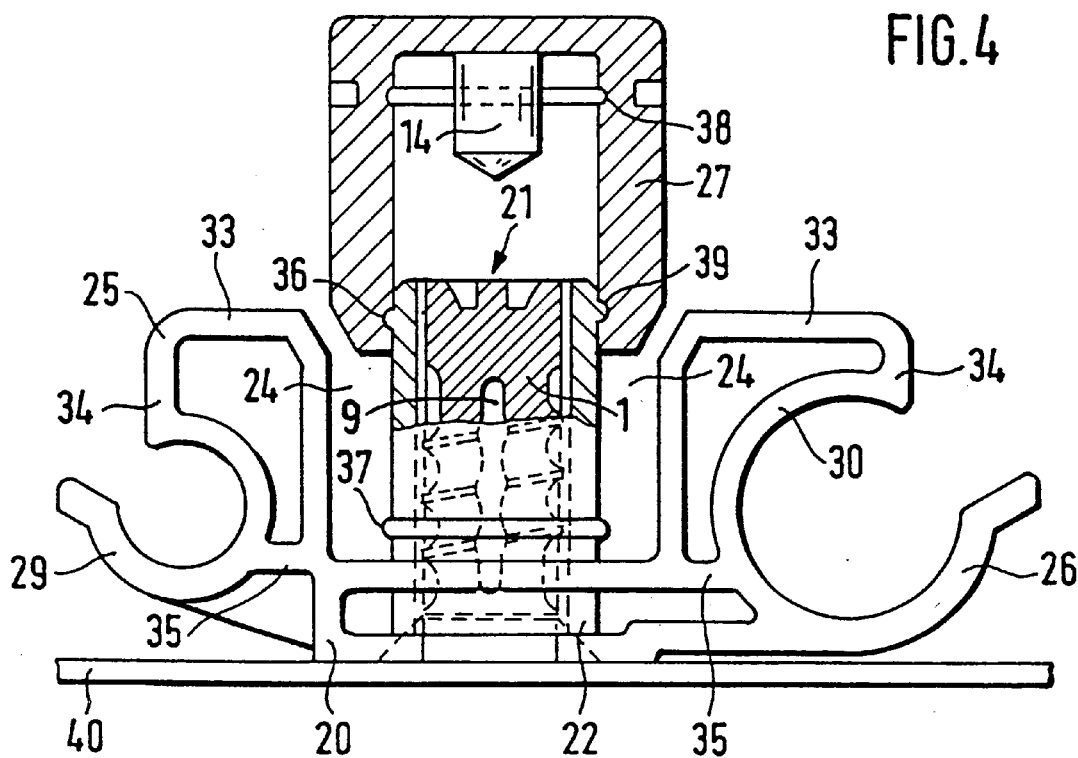
FIG. 4 is a partially sectional side view of the mounting part according to FIG. 3 during the process of mounting on the fastening stud according to FIG. 1 and FIG. 2.
Figure 5:
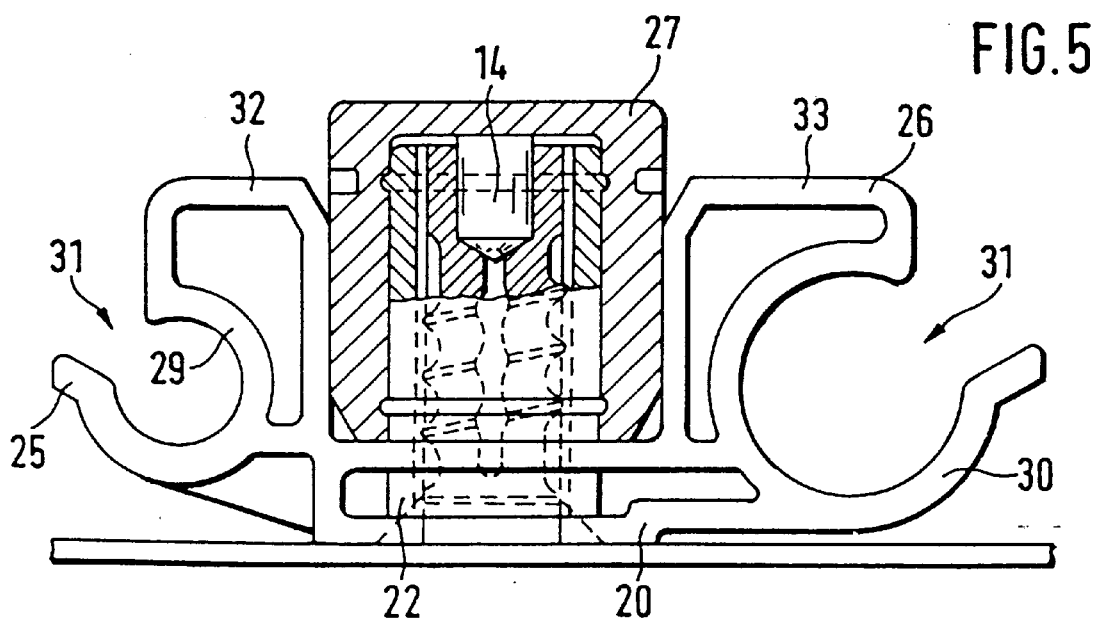
FIG. 5 shows the mounting process according to FIG. 4 at a later stage.

FIGS. 3 to 5 show a line holder 20 for a mounting system 1; 20 according to the invention. The line holder 20 has, on opposing sides of the receiving space 21 for receiving the weld stud 1, a respective line clip 25, 26 for clipping-in lines of suitable cross section. The line clips 25, 26 are flexible in design. The line holder 20 is injection moulded from plastics material and has a structure with a plurality of reliefs 23 which extend transversely to the peripheral direction of the wall 22 or of the weld stud 1, i.e. longitudinally, and are formed on the internal surface 28 of the wall 22 in the form of longitudinal ribs 23. The line holder 20 also has a securing cap 27 for securing the connection between the line clips 25, 26 and a clipped-in line. The securing cap 27 is movable after application of the line holder 20 to the weld stud 1 from a first position (see FIG. 4), in which it is able to clip a line, into a second position (see FIG. 5), in which it restricts the flexibility of the line clip 25, 26. In other embodiments of the mounting part according to the invention, the mounting part is a line holder with only one or more than two line clips 25, 26. The connection is secured there in the manner described herein.

In the particular design of the line holder 20, the line clips 25, 26 and the wall 22 of the receiving space 21 each define opposing sides of an intermediate space 24, the securing cap 27 at least substantially filling the intermediate space 24 in the second position.

It is advantageous if the line clips 25, 26 have an elastic rim 29, 30 for holding a line portion, the rim 29, 30 having a respective longitudinal orifice 31 for introduction of the line. The line clips 25, 26 also have a bridge-like elastic supporting element 32, 33 which is connected to the rim 29, 30 in a region along the longitudinal orifice 31 by a first foot 34 and is connected to the rim 29, 30 in a region substantially opposing the longitudinal orifice 31 by a second foot 35. The supporting element 32, 33 limits the intermediate space 24.

In the design of the line holder 20 shown in FIGS. 3 to 5, the flexibility of the line clip 25, 26 is restricted in the second position of the securing cap 27 in that the securing cap 27 restricts or prevents escape of the supporting element 32, 33 and therefore prevents enlargement of the longitudinal orifice 31 which would allow the escape of a line. The design has the advantage, in particular, that the connection between the line clips 25, 26 and a respectively clipped-in line can be secured by a constructionally particularly simple securing element. In contrast, securing elements which have complicated shapes and are specifically adapted to the respective rim for holding the line portion are known from the state of the art, for example DE 38 02 698.

The specific design of the securing cap 27 and the wall 22 of the receiving space 21 is also advantageous. The wall 22 has an externally peripherally extending first bead 36 and second bead 37, the beads 36, 37 being mutually spaced in parallel. The first bead 36 is preferably arranged substantially at the upper end of the wall 22. The securing cap 27 surrounds the wall 22 in the first and second position. The securing cap 27 has a first groove 38 and a second groove 39 so the first bead 36 is capable of catching in the second groove 39 in the first position and the first bead 36 is capable of catching in the first groove 38 and the second bead 37 in the second groove 39 in the second position. In a variation, the beads are formed on the securing cap and the grooves on the wall. In a further variation, the securing cap does not comprise a wall but acts on the outer periphery of the wall at least at two mutually opposed positions.

A further feature of the specific embodiment is the presence of a pin 14 which is provided as a clamping member in the second position of the securing cap 27 in the upper end-face tube orifice 4 of the tubular weld stud 1 and prevents radial compression of the weld stud 1 at least in the upper region. During penetration of the pin 14 into the interior of the tube, the weld stud 1 is radially expanded while increasing its elastic restoring forces so the crest 7 sinks into the longitudinal ribs 23 of the line holder 20. The securing cap 27 therefore fulfils the function of securing the connection between the line holder 20 and the weld stud 1 in addition to the function of securing the connection between the line clips 25, 26 and the lines. Application of the securing cap 27 is reversible. The line holder 20 can be unscrewed from the weld stud 1.

In a further embodiment of a line holder, not shown, the line holder can be applied to the fastening stud on both sides. In a specific embodiment of this type, the line holder is designed similarly to the line holder 20 so it can be applied first to the fastening stud selectively with one of the two opposing orifices of its receiving space. However, the material connections between the wall of the receiving space and the line clips are arranged further in the centre of the axial length of the wall so the securing cap can be applied from both sides of the receiving space. The line clips are also designed such that the longitudinal orifices are easily accessible independently of the choice of the application direction.

Figure 6:
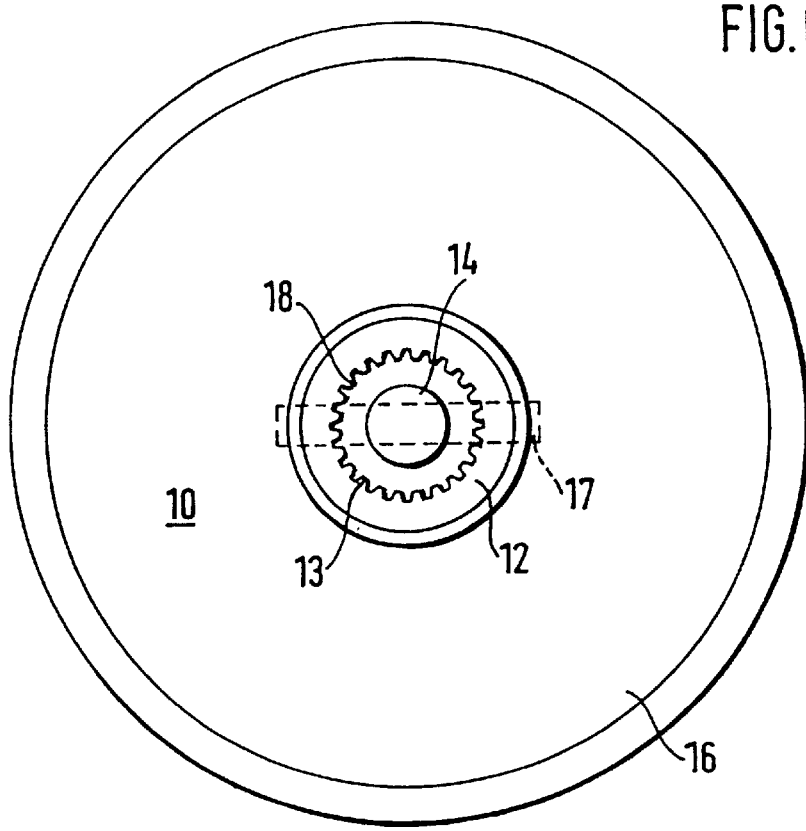
FIG. 6 is a view from below of a second embodiment of a mounting part.
Figure 7:
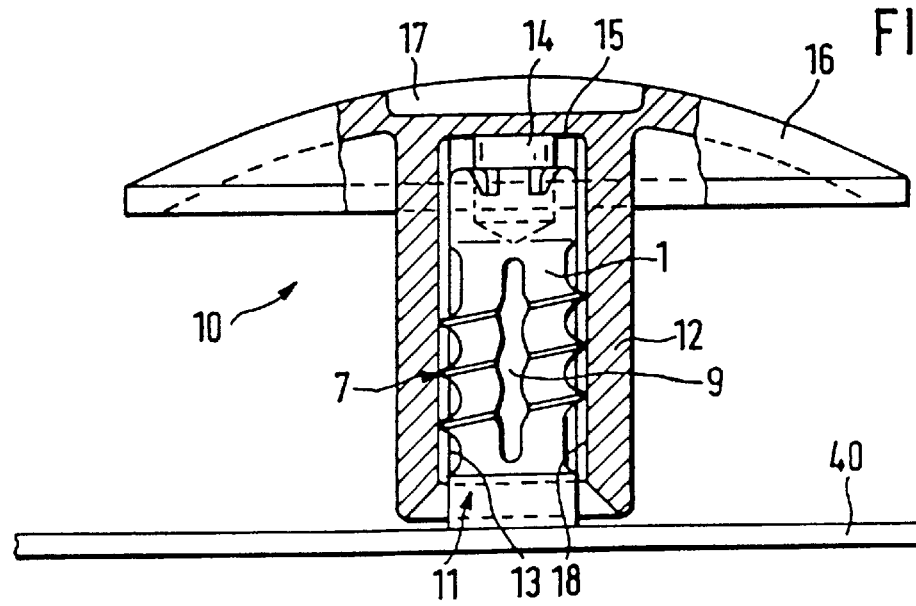
FIG. 7 is a partially sectional side view of the mounted mounting part according to FIG. 6.

FIGS. 6 and 7 show a further embodiment of a mounting part according to the invention. The mounting part is designed as a push-button 10 which can be applied to the weld stud 1 and is injection-moulded in one piece from plastics material. The weld stud 1 is welded on the vehicle body panel 40. In particular, sheets of material can be located between the mushroom-like head 16 of the push-button 10 and the vehicle body panel 40 and are then secured by the push-button 10. The push-button 10 has a receiving space 11 for receiving the weld stud 1. FIG. 6 shows that the internal surface 18 of the receiving space 11 is structured with a plurality of longitudinal ribs 13. The wall 12 of the receiving space 11 has an annular cross section. A pin 14 which is pressed into the upper end-face tube orifice 4 of the weld stud 1 when the push-button 10 is applied to the weld stud 1 is formed at the upper end of the receiving space 11. As already described above, the radially outwardly acting forces causing the crest 7 of the thread to be pressed into the longitudinal ribs 13 are produced or increased thereby. Pressing in also continues for some time after completion of the application process as the plastics material gradually flows under the pressure of the crest 7 of the thread. At its top free end, the head 16 has a screwdriver slot 17 so the push-button 10 can be screwed onto the weld stud 1 or can be unscrewed from it.

In a further embodiment (not shown) of a push-button according to the invention, the receiving space is designed continuously in the manner of a duct so the push-button can be applied to the fastening stud on both sides. In a variation, a clamping member is not provided or is provided as a separate part.

The mounting system according to the invention allows simple fastening of a mounting part on a fastening stud by application of the mounting part. A reliable connection is produced in that dimensionally stable material is pressed spotwise into plastically deformable material. The parts of the mounting system according to the invention can be produced by slight modification of known processes.

What is claimed is:

1. A mounting system comprising a fastening stud and a mounting part adapted to be applied to said fastening stud, said part including a receiving space operable to receive said fastening stud, wherein the internal surface of said receiving space and the external peripheral surface of said fastening stud are frictionally connected to one another when the mounting part is applied, said external peripheral surface having a structure with at least one substantially peripherally extending crest-like relief of relatively rigid material and said internal surface having a structure with at least one relief of plastically deformable material extending substantially transversely to the peripheral direction, said fastening stud being radially elastic.

2. A mounting system according to claim 1, wherein said fastening stud is a weldable metal.

3. A mounting system according to claim 1, wherein said fastening stud includes a thread located on the external surface of said stud.

4. A mounting system comprising a fastening stud and a mounting part adapted to be applied to said fastening stud, said part including a receiving space operable to receive said fastening stud, wherein the internal surface of said receiving space and the external peripheral surface of said fastening stud are frictionally connected to one another when the mounting part is applied, said external peripheral surface having a structure with at least one substantially peripherally extending crest-like relief of relatively rigid material and said internal surface having a structure with at least one relief of plastically deformable material extending substantially transversely to the peripheral direction, said fastening stud including a tube with a slot extending substantially in the longitudinal direction.

5. A mounting system according to claim 4, wherein is radially elastic.

6. A mounting system according to claim 4, wherein said fastening stud includes an end-face orifice and said mounting system further including a clamping member which extends into said orifice when said assembly is complete.

7. A mounting system according to claim 6, wherein said clamping member is connected to said mounting part.

8. A mounting system according to claim 7, wherein said clamping member is movable, after application of the mounting part to the fastening stud, from a first position outside the fastening stud into a second position inside the fastening stud.

9. A mounting system comprising a fastening stud and a mounting part adapted to be applied to said fastening stud, said part including a receiving space for receiving the fastening stud, wherein the internal surface of said receiving space and the external peripheral surface of said fastening stud are frictionally connected to one another when the mounting part is applied, said fastening stud further including an end-face orifice, and said mounting system further including a clamping member operably extending into said orifice when said assembly is complete.

10. A mounting system according to claim 9, wherein said clamping member is movable, after application of mounting part to said fastening stud, from a first position outside said fastening stud into a second position inside said fastening stud.

11. A mounting part comprising:
   for use in a mounting system, said part including an elongated receiving space for receiving an elongated fastening stud, said space an internal surface of said mounting part defining at least a portion of an elongated receiving space, said internal surface including at least one plastically deformable protrusion extending from said internal surface into said space;
   at least one flexible clip operable for receiving an elongated object;
   a securing element operable for securing the connection between said clip and the object, said securing element being movable from a first position, in which it allows the object to be inserted, into a second position, in which it restricts the flexibility of said clip to substantially prevent the release of the object; and
   a clamping member connected to said securing element.

12. A mounting system comprising an elongated fastening stud, defining an elongated receiving space operable to receive said stud, wherein said internal surface includes at least one relief of plastically deformable material extending substantially in the direction of elongation of said space, and a clamping member engagable with said interior surface of said fastening stud.

13. A mounting system according to claim 12, further comprising a button having a mushroom-like head arranged at the end of said receiving space.

14. A mounting system according to claim 12, further comprising:
   (a) at least one flexible line clip; and
   (b) a securing element operable to secure the connection of said line clip,
   wherein said securing element is movable from a first position, in which it allows access to said line clip, into a second position, in which it restricts access to said line clip.

15. A mounting system according to claim 14, wherein said at least one line clip and a wall of the receiving space define an intermediate space, said securing element at lest substantially filling said intermediate space in the second position.

16. A mounting system according to claim 14, further comprising an elongated line, said line clip including an elastic rim operable to hold said line, said rim having a longitudinal orifice operable to receive said line, said line clip further having a bridge-like elastic supporting element which includes a first foot connected to said rim in a region adjacent said longitudinal orifice and a second foot connected to said rim in a region substantially opposed to said longitudinal orifice.

17. A mounting system according to claim 14, wherein two of said line clips are arranged on two mutually opposed sides of said wall.

18. A mounting part comprising:
   an internal surface defining an elongated receiving space, said internal surface including at least one relief of plastically deformable material extending substantially in the direction of elongation of said space;
   said internal surface of said receiving space having an externally peripherally extending first bead and a second bead, said beads being mutually spaced in a substantially parallel manner and said first bead being arranged substantially at an end of said wall; and
   a securing element having a first groove and a second groove;
   wherein the first bead is engagable with said second groove, in said first position, and wherein said first bead is engageable with said first groove and said second bead in engageable with said second groove when in said second position.

19. A mounting part according to one of claims 14 to 18 further comprising a clamping member integrally connected to said securing element.

20. A weldable fastening stud comprising an internally hollow body being radially elastically resilient, an axially extending slot located in said body, at least one additional axial aperture being located in said body to increase the radial elasticity, said axial aperture extending at least half of the axial length of said body.

21. A fastening stud according to claim 20, wherein said body is elongated said axial aperture has a greater dimension in the elongated direction of said body than in the peripheral direction.

22. A fastening stud according to claim 20, wherein said axial aperture is arranged substantially on the side of said body opposing said slot.

23. A fastening stud according to claim 20, further comprising an external thread located on an external surface of said body.

24. A fastening apparatus comprising:
   a stud having a longitudinally elongated opening;
   a holder having an aperture removably insertable around said stud;
   a flexible clip having an openly accessible orifice, said clip being coupled to said holder; and
   a cap mountable over a portion of said stud, said cap being operable to assist in securing said holder to said stud, said cap also being operable to assist in reducing flexibility of said clip.

25. The apparatus of claim 24 further comprising a second flexible clip having an openly accessible orifice, said cap being operable to assist in reducing flexibility of said second clip.

26. The apparatus of claim 24 wherein said holder, clip and cap are plastic.

27. The apparatus of claim 24 wherein said clip has a substantially circular inside surface.

28. The apparatus of claim 24 further comprising at least one groove located on one of said cap and said holder, and at least one bead located on the other of said cap and said holder, said groove and bead being selectively engagable to at least temporarily maintain the locational relationship of said cap and holder.

29. The apparatus of claim 24 further comprising an external thread located on said stud.

30. The apparatus of claim 24 further comprising a projection extending from said cap operably being insertable into an end of said stud.

31. The apparatus of claim 24 further comprising:
   a panel and an elongated line;
   said stud being secured to said panel;
   said line being receivable in said clip; and said cap, holder and clip being operable to fasten said line to said panel.

32. The apparatus of claim 24 wherein the stud is a metallic weld stud.

33. A fastening apparatus comprising:
- a metallic stud having an external thread and a longitudinally elongated opening, said stud being longitudinally elongated;
- a member having a wall operably surrounding a threaded section of said stud; and
- a set of longitudinally elongated ribs inwardly projecting from said wall, a depression located between each adjacent pair of said ribs;
- wherein said ribs are operably deformable when engaging said thread of said stud.

34. The apparatus of claim 33 wherein said stud has a hollow end and said member includes a projection insertable into said hollow end.

35. The apparatus of claim 34 wherein insertion of said projection into said hollow end causes the adjacent portion of said stud to radially expand.

36. The apparatus of claim 33 further comprising a laterally enlarged head mounted to said wall, said wall having a substantially circular cross sectional shape.

37. The apparatus of claim 33 further comprising an outer structure insertable around said member, said outer structure being removably secured to said member.

38. The apparatus of claim 33 further comprising a panel and a retained device, said stud being welded to said panel, said member fastening said retained device to said panel.

* * * * *